Patented July 30, 1946

2,404,840

UNITED STATES PATENT OFFICE 2,404,840

RESINS MADE WITH LIGNIN AND HEAT REACTIVE CONDENSATION PRODUCTS AND METHODS FOR PREPARING THE SAME

Mortimer T. Harvey, South Orange, N. J., assignor to Harvel Research Corporation, a corporation of New Jersey No Drawing. Application May 6, 1943, Serial No. 485,884

2 Claims. (Cl. 260—17.5)

This invention relates to novel compositions of matter and to methods for producing the same. More particularly the invention is directed to the methods for producing and to the novel compositions of matter obtained with a lignin as one of the starting materials. Among the lignins with which this invention is primarily concerned are free lignin, alpha-lignin, beta-lignin, ligno-cellulose as it is present in vegetable matter such as wood and the like and also after it has been chemically treated whereby it is converted to the more soluble form.

These lignins may be obtained from a number of different products, and the principal source thereof is cellulose bearing vegetable matter among which are wood, flax, straw, corn stalks, corn cobs, bagasse and the like. Certain woods such as those obtained from redwood trees contain as high as 25% lignin which is composed of two principal constituents: 64% alpha-lignin and 36% beta-lignin. The free lignin may be extracted from the cellulose bearing vegetable matter with alcohol and the combined lignin contained therein may be obtained by treating the ligno-cellulose components thereof with sodium hydroxide at pressures of about 10 atmospheres. Another method of obtaining lignin is to hydrolize the cellulose bearing vegetable matter with a dilute solution of sulphuric acid and acetic acid. Still another method of obtaining lignin and particularly applicable to straw is to digest straw with alkaline carbonates then treat the extract with an acid to precipitate the lignin components and purify the alkali solution by further precipitation with an acid. Lignins may also be obtained from the alkali-soluble waste liquors of the sulphite, sulphate and soda processes employed in the manufacture of paper. The alkali solution black liquor, a waste product in the paper industry, may be concentrated by evaporation so that the lignins and phenols float to the top and then are removed and subsequently reprecipitated by dissolving in solvents such as alcohol, neutralized and separated from the salts that are present. Purified lignins may also be obtained by heating cellulose bearing vegetable matter for about 12 hours at 150° C. under about 100 pounds pressure with a hydrotropic solvent. After this solvent extraction, it may be precipitated by the addition of water and acid.

Heretofore, due to the cheapness of lignins, it has been proposed to subject them to pressures of between about 100 to 3000 pounds per square inch and a temperature between about 200° F. and 400° F. in an effort to obtain so-called "plastic" articles of manufacture. Lignins, prior to this invention, have not been prominent in the art of plastics because (a) they do not flow well even when subjected to heat and high pressures, and (b) they have poor water resistance after curing, have very poor alkali resistance after curing. When products such as a wood flour or the like containing an appreciable percentage of said lignins is subjected to a high pressure and an elevated temperature in a mold, very high pressures are required, the product does not cure well, the resultant product is of a fibrous structure, if it is taken out of the mold while still hot, it tends to distort and crack.

In its more specific aspect, this invention is concerned with modifying said lignins with a heat reactive resin produced in accordance with the teachings of my copending applications Serial Nos. 436,475; 476,968; 476,969 of which applications this application is a continuation-in-part the latter two of which have matured into Patents Nos. 2,343,972 and 2,343,973. In said applications, I have disclosed thermosetting heat reactive resins produced by reacting under certain conditions formaldehyde with a material selected from the group consisting of furfuryl alcohol and polymerized acid condensation products of furfuryl alcohol. Each of said applications is hereby made part of this application and the thermosetting heat reactive resins disclosed in applications Serial No. 436,475, filed March 27, 1942; 476,968 and 476,969 filed February 24, 1943, are respectively referred to herein as products A, B and C.

A typical example of the product A as well as the method for producing the same is herein illustrated in Example A.

Example A

| | Pounds |
|---|---|
| Formaldehyde solution (37% formaldehyde) | 1200 |
| Furfuryl alcohol | 1500 |
| Aqueous solution of lactic acid (80% lactic acid) | 75 | were loaded in a still and refluxed at 205° F. to

210° F. for 2½ hours until the reaction was complete. The mass was then dehydrated at atmospheric pressure at 200° F. to 205° F. until approximately 22 gallons of water had been distilled off. The vacuum was then put on the still and the mass further dehydrated at 24–26 inches vacuum until approximately a total of 135 gallons of water had been removed from the still, checking the viscosity frequently. When the viscosity of the mass in the still had increased to 378 centipoises at 25° C. the mass was chilled to 150° F. and screened, yielding about 1800 pounds of a heat reactive resin capable of being heat converted to the infusible state.

A typical example of product B as well as the method of producing the same is herein illustrated in Example B.

Example B

| | Grams |
|---|---|
| Furfuryl alcohol | 200 |
| Commercial formaldehyde solution | 320 |
| Lactic acid (80% solution) | 6 | were boiled together under a reflux condenser for about 1¾ hours after which the reaction product was dehydrated under vacuum. The dehydration distillate weighed 216 grams and the residue weighed 294 grams and is a fusible intermediate resin soluble in alcohol and acetone.

A typical example of product C as well as method of producing the same is herein illustrated in Example C.

Example C

| | Grams |
|---|---|
| Furfuryl alcohol | 1000 |
| 80% lactic acid | 50 | were refluxed together for ½ hour at approximately 95° C. to 110° C. and then dehydrated while refluxing. 70 cc. of water were removed within one hour. The specific gravity of the remaining product was 1.165 at 25° C. The viscosity at 25° C. was 50 centipoises. It is insoluble in water, completely soluble in acetone and only partially soluble in alcohol. To 500 grams of this acid condensation-polymerization product of furfuryl alcohol, 417 grams of formaldehyde (37½% water solution) were added and the reaction was accomplished by heating at about 100° C. under reflux for one hour. The resulting product was then partially dehydrated under atmospheric pressure and finally under vacuum. The resultant dehydrated mass is a thermosetting heat reactive resin.

In the practice of this invention, the thermosetting heat reactive resins, produced by reacting formaldehyde and furfuryl alcohol or polymerized acid condensation products of furfuryl alcohol as set forth in my copending applications, are heated with lignin to produce a novel thermosetting fusible resin which has good flow characteristics, is water and alkali resistant, will not distort or crack if removed hot from the mold, may be molded at temperatures much lower than those required for molding lignin and are non-fibrous molded end products when cured. Thus the major disadvantages attendant lignin as a resin have been greatly reduced if not completely eliminated. Besides these advantages, the novel resin of this invention eliminates one of the disadvantages of the resins of the aforementioned applications, which resins on being subjected to curing temperatures in a mold tend to bend upon being ejected from the mold in commercial practice. However, the combination of the present invention eliminates this disadvantageous characteristic. Thus, I have provided novel resins having certain advantages over the products produced with lignin alone and those produced with only formaldehyde and furfuryl alcohol or polymerized acid condensation products of furfuryl alcohol.

According to this invention lignin and/or cellulose bearing vegetable matter containing lignin is heated with a thermosetting heat reactive resin of formaldehyde and furfuryl alcohol and/or polymerized acid condensation products of furfuryl alcohol. The ratio of the quantity by weight of the lignin to that of the heat reactive resin is between about 90 to 10 and 5 to 95. When the cellulose bearing vegetable matter containing lignin is employed I prefer that the same be comminuted so that it is present as thin fibres or as a flour in order that the lignin content thereof may be readily available so that it may be in contact with the thermosetting heat reactive resins. When cellulose bearing vegetable matter is employed as one of the starting materials, I prefer that the lignin content thereof be at least 10% of the quantity of reactive resin used if no additional lignin is added. However, if the quantity of said vegetable matter employed is such that the lignin content thereof is less than 10% of the reactive mass, then additional lignin is preferably added. In accordance with this invention, the lignin and/or the lignin containing vegetable matter may be heated with one or more of the reactants in the course of producing the resins of formaldehyde and furfuryl alcohol or polymerized acid condensation product of furfuryl alcohol. In addition, the lignins may by the application of heat be readily dissolved in said fusible thermosetting reaction products of formaldehyde and furfuryl alcohol or polymerized acid condensation products of furfuryl alcohol. And, after said solution has been obtained, and the product is converted to the infusible state, the cured product will have a shiny fracture showing that the lignins have not separated from the other resin.

The invention accordingly comprises the several steps and the relation of one or more of such steps with respect to each of the others, and compositions of matter possessing the characteristics, properties and relation of components, all of which will be exemplified in the following detailed disclosure, and the scope of the invention will be indicated in the claim.

For a fuller understanding of the invention, reference should be had to the following examples which are given to illustrate further the invention and are not to be construed in a limiting sense, all parts being given by weight, unless otherwise indicated.

Example 1

| | Parts by weight |
|---|---|
| Wood flour containing between 5–25% lignin | 60 |
| A heat reactive product A, B or C | 50 |
| Water insoluble, alcohol soluble lignin | 10 |
| Iron oxide | 5 |
| Boric acid | 1 |
| Zinc stearate | 1 | were milled together on hot differential speed roll rubber mill at approximately 200° F. to 220° F. until the mass became homogeneous, dry and did not adhere to the slower roll. This mass which is heat reactive is then removed, cooled and ground into a powder, preformed and cured at about 300° F. to 380° F. for from one to five minutes, depending on the size of the piece. The finished product thus obtained is infusible.

Example 2

A heat reactive product A, B or C__parts
    by weight__ 20 to 50
Red wood flour containing between 20%–25%
    free lignin as well as other resins__parts
    by weight__ 100
Boric acid_____parts__ 2
Zinc stearate_____do__ 1 were milled together on hot differential speed roll rubber mill at approximately 200° F. to 220° F. until the mass became dry and did not adhere to the front slower roll. This mass which is heat reactive is then removed, cooled and ground into a powder, reformed and cured at about 300° F. to 380° F. for from one to five minutes depending on the size of the piece. The finished product thus obtained is infusible.

Example 3

|  | Parts |
|---|---|
| Heat reactive liquid reaction product A, B or C | 100 |
| Water soluble lignin | 100 to 400 |
| Water | 400 |
| Bentonite | 25 | were homogenized together in a dough mixer or the like to a smooth emulsion which may be used as coating material or may be mixed with fillers such as asbestos or organic or inorganic materials, dried and molded under heat and pressure or in an open oven such as for making of brake linings and finds application as brake lining. The finished products thus obtained are infusible. When used as a coating and impregnating material, the so coated and impregnated base find application in bottle cap closures, oil resisting containers, sand paper, etc.

Example 4

|  | Parts |
|---|---|
| Heat reactive liquid reaction product A, B or C | 100 |
| Alcohol soluble lignin | 20 | were heated and mixed together until a homogeneous dry fusible thermosetting resin resulted on cooling. This product may then be used with, for example, an equal part by weight of wood flour, milled together on rubber rolls and cured to the infusible state in a press under heat and pressure.

Instead of adding the lignin to the heat reactive reaction products A, B or C as illustrated in the foregoing examples 1 to 4, the lignin may be added to the reactants prior to the production of said products A, B or C and the following examples will serve as illustration thereof.

Example 5

|  | Parts by weight |
|---|---|
| Furfuryl alcohol | 100 |
| 80% lactic acid | 5 | were heated together under a reflux condenser at approximately 110° C. for one hour to condense said furfuryl alcohol and polymerize said condensation product. Then 25 parts by weight of alcohol-soluble lignin was added thereto and the whole mass was heated together for approximately ten minutes to dissolve the lignin therein. Then to this mass was added 95 parts by weight of a water solution of formaldehyde (37½% of formaldehyde) and the whole mixture heated to boiling and maintained in this state of boiling for one hour forming a very heavy thick resinous material which is soluble in alcohol, insoluble in water and has a specific gravity of 1.2 at 25° C. It was then cooled to room temperature and the water decanted. The almost dry resin, which is fusible and thermosetting was mixed with an equal part by weight of wood flour, 1% boric acid and 5% carbon black on a differential speed roll rubber mill. After milling until the mass became brittle, although still fusible, the mass was removed and cured in a press under heat and pressure at temperatures of approximately 300° F. to 385° F. in from 1 to 10 minutes, depending on the size. This finished product is an infusible resin.

Example 6

| | |
|---|---|
| Furfuryl alcohol_____parts by weight__ | 100 |
| Aqueous solution of lactic acid (80%)____do__ | 5 |
| Water-insoluble, alcohol-soluble lignin parts__ | 25 |
| Water solution of formaldehyde (37½%) do__ | 85 | were heated to boiling and maintained in this state of boiling under a reflux condenser for two hours. The mass was allowed to cool to room temperature and water was decanted therefrom leaving behind an almost dry resin which is fusible and thermosetting although it still contained some water. This resin was mixed with an equal part by weight of wood flour on the rubber mill, and 1% boric acid and 5% carbon black was added. After milling until the mass became brittle, although still fusible, the mass was removed and cured in a press under heat and pressure at temperatures of approximately 300° F. to 385° F. in from 1 to 10 minutes depending on the size. This finished product is an infusible resin.

Example 7

|  | Parts by weight |
|---|---|
| Product A, B or C | 100 |
| Lignin | 100 | were mixed and sufficient 10% sodium hydroxide or any other alkali added to change the pH to the alkaline side. The quantity of alkali added is preferably such that the pH is between 9 and 14. If slightly alkaline, the product may be intimately mixed with fillers such as asbestos or wood flour, dehydrated and cured at 100° C. to 200° C. The resultant or finished product is an infusible resin.

Since certain changes in carrying out the above process and certain modifications in the compositions which embody the invention may be made without departing from its scope, it is intended that all matter contained in the above description shall be interpreted as illustrative and not in a limiting sense.

It is also to be understood that the following claims are intended to cover all the generic and specific features of the invention, which as a matter of language might be said to fall therebetween; and that they are intended to be inclusive in scope and not exclusive, in that, if desired, other materials may be added to my novel composition of matter herein claimed without departing from the spirit of the invention. Particularly it is to be understood that in said claims, ingredients or components recited in the singular are intended to include compatible mixtures of said ingredients wherever the sense permits.

Having thus described my invention, what I claim and desire to protect by Letters Patent is:

1. The method comprising heating a mixture comprising lignin and a thermosetting heat reactive acid condensation product of formaldehyde and a material selected from the group consisting of furfuryl alcohol and a fusible acid condensation product of furfuryl alcohol, the ratio of the quantity of the former by weight to the quantity of the latter by weight being in the range of 100 to 100 and 400 to 100.

2. A fusible thermosetting resin obtained by heating a mixture comprising lignin and a thermosetting heat reactive acid condensation product of formaldehyde and a material selected from the group consisting of furfuryl alcohol and a fusible acid condensation product of furfuryl alcohol, the ratio of the quantity of the former by weight to the quantity of the latter by weight being in the range of 100 to 100 and 400 to 100.

MORTIMER T. HARVEY.